US006912321B2

(12) United States Patent
Gindele (10) Patent No.: US 6,912,321 B2
(45) Date of Patent: Jun. 28, 2005

(54) METHOD OF COMPENSATING A DIGITAL IMAGE FOR THE EFFECTS OF FLARE LIGHT

(75) Inventor: Edward B. Gindele, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 542 days.

(21) Appl. No.: 10/104,578

(22) Filed: Mar. 22, 2002

(65) Prior Publication Data

US 2003/0179948 A1 Sep. 25, 2003

(51) Int. Cl.[7] .................................................. G06K 9/40
(52) U.S. Cl. ..................... 382/274; 348/226.1; 348/688
(58) Field of Search ....................... 382/274; 348/226.1, 348/227.1, 688

(56) References Cited

U.S. PATENT DOCUMENTS

| | | | | |
|---|---|---|---|---|
| 3,641,259 A | * | 2/1972 | Loughlin | 348/688 |
| 4,584,598 A | * | 4/1986 | Kutaragi | 348/226.1 |
| 4,728,791 A | * | 3/1988 | Goto | 250/586 |
| 4,974,810 A | | 12/1990 | Fiske | 250/216 |
| 5,155,586 A | | 10/1992 | Levy et al. | 358/54 |
| 5,208,874 A | | 5/1993 | Omura | 382/54 |
| 5,216,521 A | | 6/1993 | Birgmeir | |
| 5,280,354 A | | 1/1994 | Nakamura | 358/168 |
| 5,691,772 A | * | 11/1997 | Suzuki | 348/223.1 |
| 5,805,213 A | * | 9/1998 | Spaulding et al. | 348/222.1 |
| 5,892,852 A | | 4/1999 | Namizuka et al. | 382/254 |
| 6,229,624 B1 | | 5/2001 | Gilman et al. | 358/1.9 |
| 6,373,993 B1 | * | 4/2002 | Nomura | 382/274 |
| 6,597,401 B1 | * | 7/2003 | Maruyama | 348/335 |

FOREIGN PATENT DOCUMENTS

| | | |
|---|---|---|
| DE | 40 05 173 A1 | 8/1991 |
| EP | 0940 773 A2 | 9/1999 |

OTHER PUBLICATIONS

Phil Green: "Color Engineering" 2002, John Wiley & Sons, Chichester, UK, XP002276690 sec. 9.4.3, "Flare removal", p. 196.

"An Improved Dark–Object Subtraction Technique for Atmospheric Scattering Correction of Multispectral Data" by Pat S. Chavez, Jr. Remote Sensing of the Environment, 1988, 24, pp. 459–479.

* cited by examiner

Primary Examiner—Bhavesh M. Mehta
Assistant Examiner—Manav Seth
(74) Attorney, Agent, or Firm—David M. Woods (57) ABSTRACT

A method for compensating a digital image for the effects of flare light in order to generate an enhanced digital image operates upon a source digital image derived from an original scene affected by imaged flare light, wherein the source digital image includes a plurality of pixels with a known relationship to the intensity of light corresponding to the original scene. A first flare control parameter relating to the intensity of imaged flare light and a second flare control parameter relating to the average intensity level of imaged light in the original scene are derived from the source digital image, and a flare compensation function is calculated using the first and second flare control parameters. An enhanced digital image is then generated from the flare compensation function and the source digital image. More particularly, the flare parameters are derived from a linear state digital image generated from the source digital image, where the pixels of the linear state digital image have a linear relationship with the intensity of light corresponding to the original scene.

38 Claims, 5 Drawing Sheets

METHOD OF COMPENSATING A DIGITAL IMAGE FOR THE EFFECTS OF FLARE LIGHT

FIELD OF THE INVENTION

This invention relates to digital image processing and in particular to processing a digital image to remove the effects of flare light imposed by a image capture device.

BACKGROUND OF THE INVENTION

Most cameras used by professional photographers and amateurs alike suffer from flare light, i.e., non-image forming light superimposed on the image forming light. Camera designers often incorporate baffles to attenuate the magnitude of flare light due to off axis stray light sources. However, no set of baffles can completely eliminate flare light. Another component of flare light is derived from scattered light off the optical elements of the camera. For example, dirt or fingerprints on a lens surface can scatter light that would otherwise be image forming light. The scattered light contributes to the overall flare light. Flare light affects images by reducing the dynamic range of the intensities of light recorded and also has the effect of de-saturating colored objects. Images produced with cameras that produce high intensity levels of flare light appear low in contrast.

In U.S. Pat. No. 4,974,810, Fiske discloses an optical imaging system designed to compensate for the effects of flare light. The system disclosed by Fiske includes a detector for detecting light from an image and producing a signal related to the amount of light detected, a flare light detector for viewing the flare light and producing a signal related to the amount of light viewed, and a compensating device for reducing the signal from the image detector in response to the signal from the flare light detector. In this system, the amount of flare light is monitored by a separate electronic sensor while the image forming light is recorded by an area electronic imaging sensor. The flare light component, as approximated by the signal produced by the separate electronic sensor, is subtracted from the signal produced by the area electronic imaging sensor, thus compensating the image for the effects of flare light. The flare compensation method disclosed by Fiske relies on the simultaneous measurement of image forming light and non-image forming light.

A flare compensation method is disclosed by Omura in U.S. Pat. No. 5,208,874. The method includes the following steps of: optically scanning a reference image irradiated by a light source, the scanning system outputting reference image information corresponding to the reference image; generating a function denoting a response with respect to the deterioration of the image information caused by the flare based on the reference image information obtained by the scanning system; optically scanning a document irradiated by the light source by the scanning system; and performing a de-convolution operation in which the image information obtained by the scanning system and the above function are used. The method disclosed by Omura also makes explicit use of measuring the flare light distribution of a specific device and as such is not applicable for processing digital images from different devices.

The average luminance intensity level of scanned film images (obtained by scanning motion picture film frames) often undesirably varies from frame to frame due to optical scatter in the lens assembly of the scanning video camera. Some systems for converting motion picture film into video have implemented "flare correction" algorithms to smooth undesired luminance variation between consecutive frames. In U.S. Pat. No. 5,155,586, Levy et al. discloses a system that digitally generates flare correction factor signals, and employs the flare correction factor signals to compensate for undesired luminance variations from frame to frame. These "flare correction" methods employed by video systems are not designed to remove the effects of flare light introduced by the optical camera.

A video camera system designed to compensate for the effects of flare light is disclosed by Nakamura in U.S. Pat. No. 5,280,354. The video camera disclosed by Nakamura is equipped with an image sensor for producing an analog video signal, an A-D converter for converting the analog video signal into a digital video signal in a manner that any component thereof above a predetermined luminance level is clipped, and a flare correcting circuit for removing any flare component superposed on the digital video signal. Nakamura's method calculates a flare compensation signal that depends on both the average luminance level detected during a time period of several fields of the digital video signal and the detected time period during which the analog signal is clipped relating to a brightly lit object. The flare compensation signal is subtracted from the digital video signal.

An example of an image processing method that incorporates an image dependent image processing model designed to remove the effects of flare light is disclosed by Namizuka et al. in U.S. Pat. No. 5,892,852. Namizuka's method includes a processing step that calculates a flare light level based on sensing image pixels below a predetermined threshold value. The calculated flare light level is subtracted from the image data in a later processing step. In the method disclosed by Namizuka et al., the flare removal step is only applied to pixel data identified as relating to image regions containing character data since the flare removal step is designed to produce binary processed pixels values. Thus the "flare" component described by Namizuka et al. relates more to a desired "black level" for imaged character data than to overall flare light caused by the optical system since flare compensation is not performed for continuous tone image regions which experience the same overall flare light.

In U.S. Pat. No. 6,229,624, Gilman et al. disclose a method of compensating for the effects of system flare light through the use of a tone scale function. In this method, an aim tone scale function, or curve, is selected from a family of aim curves for a desired output medium having a predetermined maximum density. Each of the curves in the family of curves is constructed in such a manner such that the slope of the curve relating to the contrast of dark image regions is greater for darker image regions. Thus the application of the selected aim curve when applied to digital images has a similar effect of compensating for flare light introduced either by the image capture device or the printing device. The selection of the aim curve in the method disclosed by Gilman et al. is a manual operation, i.e., the user must the select the aim curve to be used in the image processing.

Multispectral remote sensing systems record images in many different spectral wavelength bands. Atmospheric haze due to light scattering can cause the sensed images to have elevated scene reflectance values. The magnitude of this effect is dependent on the wavelength of light with the effect being of greater magnitude for shorter wavelengths. Thus the multiple bands of a multispectral remote sensing system are affected by atmospheric haze to a varying degree.

In the journal article "An Improved Dark-Object Subtraction Technique for Atmospheric Scattering Correction of Multispectral Data", *Remote Sensing of the Environment*, 1988, 24, 459–479, Chavez describes a digital image processing method for removing the affects of atmospheric haze. In this method a pixel value corresponding to a dark object is selected in one band of a multispectral image usually corresponding to a long wavelength of light. Suitable dark objects are pools of water sensed in a infra-red wavelength band, since infra-red wavelength bands are known to be affected by little or no atmospheric haze and water has a known reflectance in the infra-red. A relative scattering model (which accounts for the relative magnitude of atmospheric haze as a function of wavelength) is used to calculate a pixel offset for each of the other multispectral bands. The pixel offsets are subtracted from the image pixel data for their respective multispectral bands. The resulting processed images have the effects of atmospheric haze removed, restoring the radiometry of the multispectral image. The linear subtraction mathematics used to remove atmospheric haze are the same as needed for a flare light removal algorithm for flare light in visible wavelength imaging systems. However, the method described by Chavez cannot be applied directly to remove flare light for visible wavelength optical camera systems since most natural images do not contain ideal dark-objects corresponding to a no-flare condition.

What is needed is a digital image processing method that can automatically sense the amount of flare light from the pixels of a digital image without having to rely on a reference dark-object or sense the non-imaged flare light within the original camera and compensate the image for the sensed amount of flare light.

SUMMARY OF THE INVENTION

The present invention is directed to overcoming one or more of the problems set forth above. Briefly summarized, according to one aspect of the present invention, the invention resides in a method for compensating a digital image for the effects of flare light in order to generate an enhanced digital image, where the method includes: a) receiving a source digital image derived from an original scene affected by imaged flare light, wherein the source digital image includes a plurality of pixels with a known relationship to the intensity of light corresponding to the original scene; b) generating from the source digital image a first flare control parameter relating to the intensity of imaged flare light and a second flare control parameter relating to the average intensity level of imaged light in the original scene; c) calculating a flare compensation function using the first and second flare control parameters; and d) generating an enhanced digital image from the flare compensation function and the source digital image. In a further aspect of the invention the flare parameters are derived from a linear state digital image generated from the source digital image, where the pixels of the linear state digital image have a linear relationship with the intensity of light corresponding to the original scene.

The advantage of the invention is that it can automatically sense the amount of flare light from the pixels of a digital image, and compensate the image for the sensed amount of flare light, without having to rely on a reference dark-object or having to sense the actual non-imaged flare light within the original camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

A digital image is comprised of a one or more digital image channels. Each digital image channel is comprised of a two-dimensional array of pixels. Each pixel value relates to the amount of light received by the imaging capture device corresponding to the geometrical domain of the pixel. For color imaging applications a digital image will typically consist of red, green, and blue digital image channels. Other channel configurations are also practiced, e.g., cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image for any of the above mentioned applications. Although the present invention describes a digital image channel as a two dimensional array of pixel values arranged by rows and columns, those skilled in the art will recognize that the present invention can be applied to mosaic (non rectilinear) arrays with equal effect.

Figure 1:
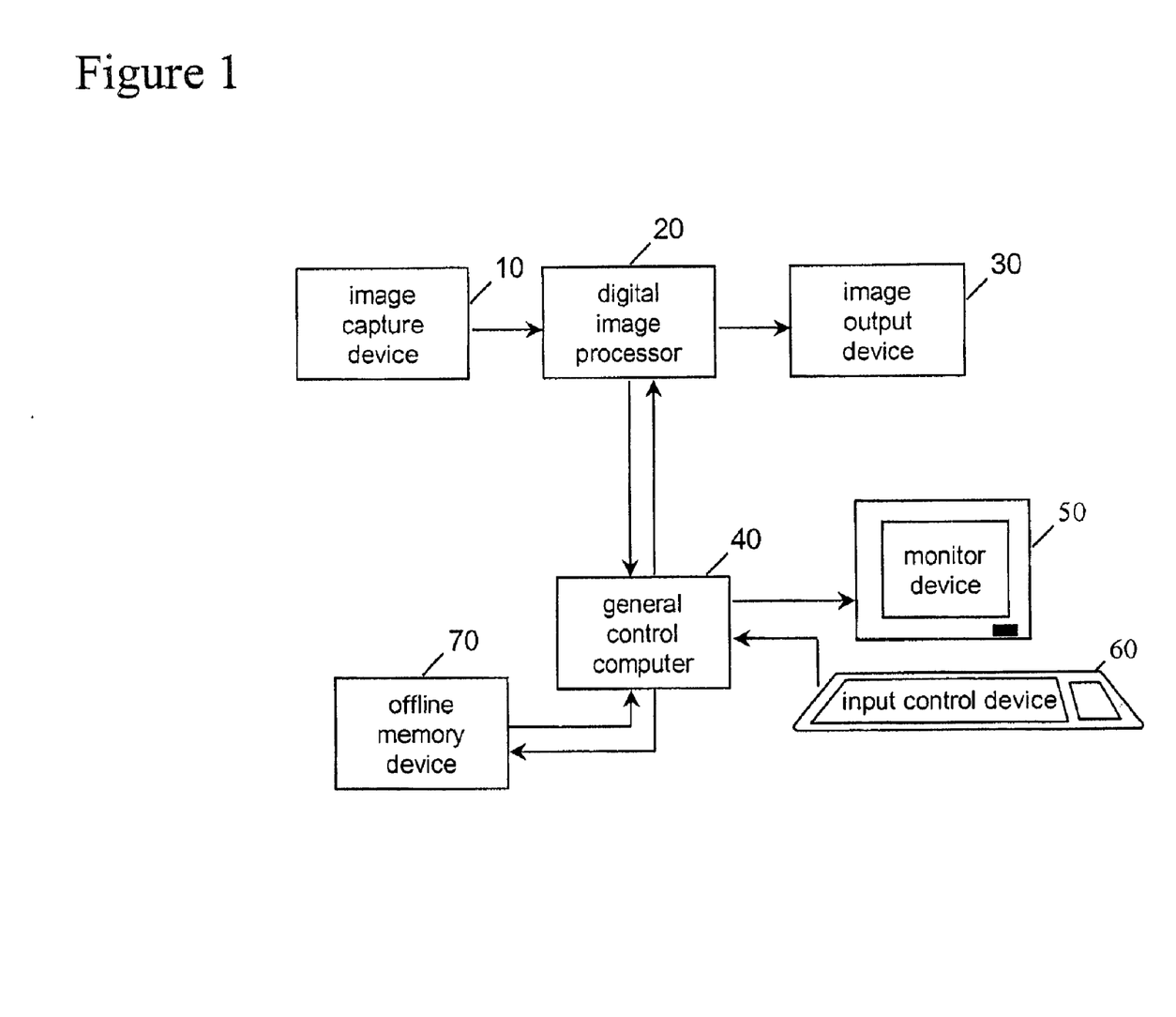
FIG. 1 is a functional block diagram showing the component parts of a digital imaging system for implementing of the present invention.

The present invention may be implemented in computer hardware. Referring to FIG. 1, the following description relates to a digital imaging system which includes an image capture device 10, an digital image processor 20, an image output device 30, and a general control computer 40. The image capture device 10 generates a source digital image that is received by the digital image processor 20. The digital image processor 20 generates an enhanced digital image from the source digital image and transfers the enhanced digital image to the output device 30 for display. The system may also include an input device control 60 for an operator such as a keyboard and or mouse pointer. Still further, as used herein, the present invention may be implemented as a computer program and may be stored in a offline memory device 70, i.e., a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The method of the present invention may be sold as a computer program product including a computer readable storage medium bearing computer code for implementing the steps of the invention. Before describing the present invention, it facilitates understanding to note that the present invention is preferably utilized on any well-known computer system, such as a personal computer.

Figure 2:
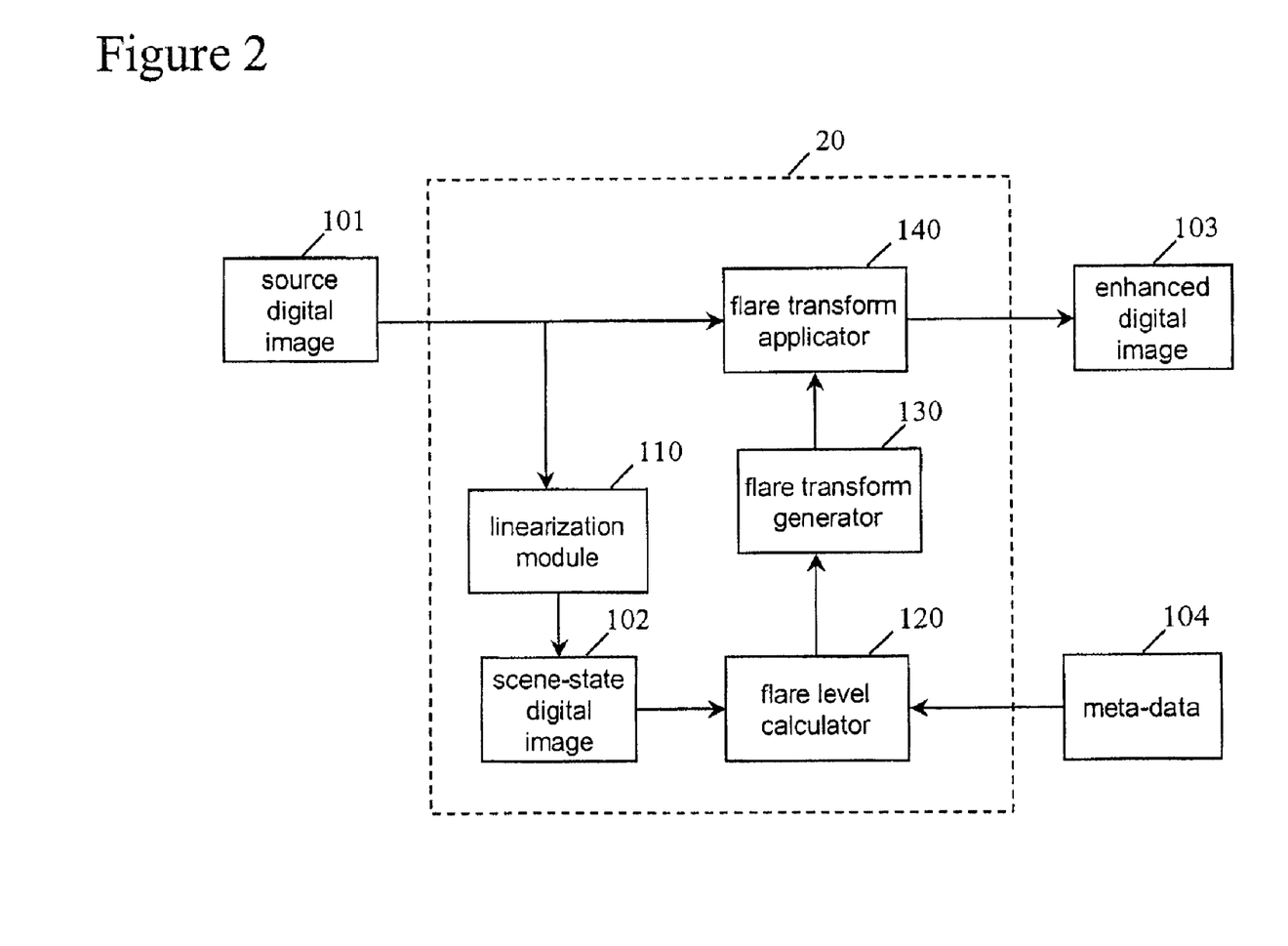
FIG. 2 is a functional block diagram showing the details of the digital image processor shown in FIG. 1.

The digital image processor shown in FIG. 1 is illustrated in more detail in FIG. 2. The source digital image 101 is received by both the linearization module 110 and the flare transform applicator 140. The linearization module 110 generates a linear state digital image 102 from the source digital image 101 for the purposes of analyzing the source digital image 101. The linear state digital image 102 is received by the flare level calculator 120, which uses the pixels of the linear state digital image 102 to calculate (a) a flare light value relating to the intensity of imaged flare light introduced, at least in part, by the image capture device 10 and (b) a mean light value relating to average light intensity level of the original scene imaged by the image capture device 10. The flare light level and mean light level are examples of flare control parameters. The flare transform generator 130 receives the flare light value and the mean light value and generates a flare compensation function, in the form of a look-up-table (LUT). The flare compensation function is received by the flare transform applicator 140 which applies the flare compensation function to the source digital image 101 to generate an enhanced digital image 103. The details of the calculation of the analysis variables and the construction of the flare compensation function are described hereinbelow.

The linearization module 110 performs two tasks. First a low spatial resolution version of the source digital image 101 is generated by a pixel averaging process. The low spatial resolution pixel values are modified with a linearization LUT to form the scene-space digital image 102. The spatial resolution of the scene-space digital image 102 is approximately 64 by 96 pixels. Thus for a source digital image 101 with a spatial resolution of 1024 by 1536 pixels, each pixel of the scene-space digital image 102 is calculated by averaging a group of 16 by 16 pixels of the source digital image 101. The present invention uses this block averaging method for its computational efficiency. Those skilled in the art will recognize that the present invention can be used with other methods for generating the low spatial resolution images. In particular, a Gaussian convolution filter can be used. Other sizes for the scene-space digital image 102 can be used. The most significant reason for selecting the 64 by 96 size for the scene-space digital image 102 is image stochastic noise. Images with a spatial resolution of approximately 64 by 96 pixels are relatively free from significant intensity levels of noise. Thus the analysis that depends on the scene-space digital image 102 is more insensitive to image noise in the source digital image 101.

The mathematical formulation for the linearization LUT depends on the relationship of the pixel values of the source digital image 101 to the intensity of light from which they were derived. Applying the linearization LUT to the low spatial resolution pixel values produces modified pixel values that have a linear relationship to the intensity of light from which they were derived. To affect this relationship the relationship of the pixel values of the source digital image 101 to the intensity of light must be known. The present invention accepts image data in three fundamental forms: linear, logarithmic, and exponential. For the case of linear image data, the pixel values of the source digital image 101 already have a linear relationship with light from which they were derived and the corresponding linearization LUT is an identity LUT, i.e, the output pixel value equals the input pixel value. The linearization LUT formulation for logarithmic and exponential image data is more complicated.

Some imaging devices allow the user to generate digital images with linear pixel data. However, many imaging devices, by default, generate digital images with exponential pixel data. These digital images appear natural when displayed on a typical computer monitor. For source digital images including exponential image data the linearization LUT is calculated using the formula given by (1):

$$f(x)=kx^n \quad (1)$$

where parameter n is set to a value of 2.4, the k parameter is used to normalize the data within a reasonable numerical range, x represents the input pixel value to the linearization LUT, f(x) represents the output value of the linearization LUT. For example, for 8-bit images the value of k is set to 0.006863 which expands the starting pixels value that range from 0 to 255 to an output range from 0 to 4095. A corresponding inverse linearization LUT is generated using equation (2):

$$b(x)=(x/k)^{1/n} \quad (2)$$

The formula for the inverse linearization LUT is the mathematical inverse as that used for the linearization LUT. The inverse linearization LUT is used later to generate the flare compensation function.

The present invention can be used with digital images generated with a photographic film transparency scanner as the image capture device 10. A source digital image is generated with such a device by photoelectrically scanning a photographic film transparency which is produced with a conventional film camera. Similarly, the present invention can also be used with digital images generated by a reflection print scanner. For these types of image acquisition systems, each component of the system can introduce flare light.

Some photographic film transparency scanners produce digital images with linear pixel data. For these devices the linearization LUT is an identity LUT as described above. Other photographic film transparency scanners produce digital images with logarithmic pixel data. The mathematical formula used to generate the linearization LUT for logarithmic pixel data is given as (3):

$$g(x)=h(10^{x/1000}-1) \quad (3)$$

where the h parameter is used to normalize the data within a reasonable numerical range, x represents the input pixel value to the linearization LUT, g(x) represents the output value of the linearization LUT. For 12-bit images the value of h is set to 2.6331 which expands the starting pixel values that range from 0 to 4095 to an output range from 0 to 32767. The corresponding inverse linearization LUT is calculated using the formula given by (4):

$$r(y)=1000 \log(y/h+1) \quad (4)$$

where y represents the input pixel value to the inverse linearization LUT, and r(y) represents the output value of the inverse linearization LUT. Since the linearization LUT and the inverse linearization LUT are mathematical inverses of one another, it follows that (5):

$$x=r(g(x)) \quad (5)$$

Those skilled in the art will recognize that the present invention is not limited to image pixel data in one of the three forms: linear, logarithmic, and exponential. In principle, image pixel data characterized as having a functional relationship to the intensity of light s(x) can be used as long as an inverse function $s^{-1}(x)$ can be generated.

The linear state digital image is analyzed by the flare level calculator 120 to produce the mean light value and the flare light value. The present invention uses an arithmetic mean formula (mean pixel value) for calculating a mean light value $P_{ave}$. Thus the mean light value is a control parameter relating to the average and overall intensity level of imaged light in the original scene and represents the average pixel value. Since the analysis calculations are performed on the image pixel values of the linear state digital image 102, the mean light value is a measure of the average intensity level of light per unit area imaged by the image capture device 10.

The intensity of flare light imaged by the image capture device 10 is approximated by the flare light value. In general, the flare light pattern imaged by an optical system is a relatively smooth spatial function. The present invention uses a constant value function approximation for the flare light pattern. Since the flare light pattern is approximated by a constant value contributing to all pixel values of the linear state digital image 102, no pixel value can be less than the pixel value corresponding to the intensity of the flare light pattern. Therefore, the minimum pixel value represents the upper bound approximation for the intensity of the flare light pattern. However, the minimum pixel value can also have a contribution of light from imaged scene objects. Thus the actual intensity of flare light experienced by the image capture device 10 is bounded by zero and the minimum pixel value. The preferred embodiment of the present invention uses a fraction of the minimum pixel value $P_{min}$ as the flare light value $\phi$ as given by (6):

$$\phi = \alpha P_{min} \tag{6}$$

where the variable $\alpha$ represents the relative contribution of actual intensity of flare light to the minimum pixel value. The variable $\alpha$ is an empirical constant derived through experimentation with data bases of digital images. If the value of $\alpha$ is set too high, the processed digital images can exhibit unwanted super color saturated pixels and excessive contrast in the dark regions of images. If the value of $\alpha$ is set too low, the processed digital image remain almost unaffected. The present invention uses a value of 0.5 for the variable $\alpha$, however, it should be noted that other values for $\alpha$ are also useful. For some sources of digital images a value of 0.75 yields acceptable results. In general, a value of 1.0 is too high. While some processed digital images are greatly enhanced using a value of 1.0 for $\alpha$, many are not. Values for $\alpha$ of 0.25 and lower generally do not result in processed images that show much change.

For color digital images, two different methods for calculating the minimum pixel value have been found to be useful. First a luminance digital image channel is derived by taking a weighted average of the red, green blue pixel values of the scene-space digital image 102. The minimum pixel value $P_{min}$ is calculated as the minimum luminance pixel values. The preferred embodiment of the present invention uses the minimum value of the red, green, and blue pixel values for forming $P_{min}$ or the minimum color pixel value. The minimum color pixel value method of calculating $P_{min}$ was found to be slightly more robust than the luminance minimum pixel value method.

While the present invention uses the minimum pixel value in the calculation for the flare light level, those skilled in the art will recognize that other mathematical formulas can be used with the present invention to yield acceptable results. For example, if the linear state digital image 102 were generated with the same spatial resolution as the source digital image 101, the minimum pixel value could be lower than the intensity of flare light due to stochastic noise. Calculating a cumulative histogram of pixel values from the linear state digital image 102 and using a fixed cumulative area percentage can serve as a useful surrogate for the minimum pixel value. For example, fixed cumulative area percentage values of between 0.1 and 1.0 percent of image area has been found to be useful. Thus the flare light value is a control parameter relating to a minimal intensity level of imaged flare light. The essential aspect of the calculation of the flare light value is that the calculated value be robustly related to the intensity of flare light imaged by the image capture device 10.

It is convenient to measure the relative intensity of flare light for a an optical imaging system so that different systems can be more easily compared. The ratio of the intensity of flare light to the intensity of a 100 percent diffuse scene reflector MX is used by the present invention. This ratio denoted by the variable $\rho$ is given by (7):

$$\rho = \phi / P_{100} \tag{7}$$

The preferred embodiment of the present invention uses the mean light value $P_{ave}$ to approximate $P_{100}$ as given by (8):

$$P_{100} = P_{ave} / \Omega \tag{8}$$

where the variable $\Omega$ represents the integrate-to-gray average scene reflectance which has been experimentally determined to be approximately 0.16 corresponding to a 16 percent reflector. Therefore, the formula for $\rho$ is given by (9), as follows:

$$\rho = \phi \Omega / P_{ave} \tag{9}$$

Typical optical imaging systems have a limited range of values for $\rho$. Professional grade camera systems measured values as low as 0.001. Single use film camera systems can have $\rho$ values as high as 0.07. If a fingerprint is allowed to smear the lens surface of an optical image system, the $\rho$ value can be as high as 0.15. However, these values for $\rho$ represent the extremes. Even professional grade cameras can produce high intensity levels of flare light when used to photograph scenes with intense light sources just outside the camera field of view. Corresponding $\rho$ values in the range of 0.03 to 0.04 are possible.

It is possible to photograph natural scenes that have a small range of scene intensities. If such a scene is photographed with a low flare light performing camera, the calculated flare light value can over estimate the actual intensity of flare light. To safe guard against this condition, the preferred embodiment of the present invention limits the maximum value of the flare light value based on the value $\tau$ for the variable $\rho$ using as given by (10):

if $\rho > \tau$ $$\phi = \tau P_{ave} / \Omega \tag{10}$$

The present invention uses a value of 0.035 for the variable $\tau$, which is a relatively conservative setting corresponding to a high value for the variable $\rho$ for a professional grade camera system. With the value of t set to 0.035 digital images derived from poor flare light performing cameras will be under corrected for flare (meaning the system will not remove as much flare from the processed digital images as it could) and digital images derived from best flare light performing cameras will be properly corrected for flare. The setting for the variable $\tau$ is largely a system design consideration, i.e., the value of $\tau$ can be set higher or lower depending on the expected flare light performance of the optical system used to generate the source digital images 101.

In an alternative embodiment of the present invention, the flare level calculator 120 receives flare meta-data 104 (shown in FIG. 2) along with the source digital image 102 from the image capture device 10 that indicates the characteristic flare light performance of the image capture device 10. This flare meta-data 104 is recorded by the image capture device 10 and is used to vary the value of τ. The present invention uses three possible values for the meta-data 104: 0, 1, and 2 indicating a high, medium, and low flare light performing camera respectively. The corresponding values of t are set to 0.035, 0.05, and 0.075 respectively. This alternative embodiment of the present invention is more complex to implement than the preferred embodiment since the meta-data 104 must be coordinated with the source digital images. However, if the meta-data 104 accurately portrays the expected flare light performance of the optical system used to generate the source digital images, the meta-data implementation will yield superior results.

In general, the amount of flare light that reaches the photosensitive element of image capture device 10 is influenced by the quality of the optics of the image capture device (e.g. the dispersion and baffling characteristics of the optics) and the scene lighting geometry (e.g. a camera pointing toward or away from the light source). Therefore, different digital images produced with the same image capture device can be affected by different amounts of flare light. Thus the meta data 104 received by the present invention is used to vary the degree to which flare is removed from the digital images. For professional grade cameras, (film or digital) the present invention uses a meta-data 104 value to indicate a value for τ of 0.035. For single use cameras the meta-data 104 value indicates a value for τ of 0.075. For point-and-shoot cameras (small cameras with non-removable lens) the meta-data 104 value indicates a value for τ of 0.05. Those skilled in the art will recognize that other values of τ can be indicated by the meta-data as needed for different classes of image capture devices.

The meta-data 104 relating to flare can be used to indicate flare light performance of a camera. For this alternative method, flare characteristics of cameras can be measured and these measured flare characteristics are encoded as meta-data 104 as a numerical value. Thus for the examples listed above, the meta-data 104 would be received as the numbers 0.035, 0.05, and 0.075. Thus for this alternative method the meta-data for flare characteristics can assume any numerical value.

The flare transform generator 130 uses the flare light value to construct a flare function implemented in the form of a LUT using the formula given by (11):

$$\Psi(x)=x-\phi \tag{11}$$

where x represents the input pixel value to the flare function, $\Psi(x)$ represents the pixel value with flare removed. The flare function given by (6) is a simple linear subtractive equation due to the fact that flare light in optical systems is superimposed on the image forming light. Therefore, if the image pixel data are transformed to have a linear relationship with the intensity of light from which the pixel data is derived, the superposition of the flare light in the optical system can be mathematically compensated by subtraction. Even though flare light in actual optical systems can have a spatially varying distribution, the non-spatially varying approximation employed by the present invention works reasonably well.

Figure 3:
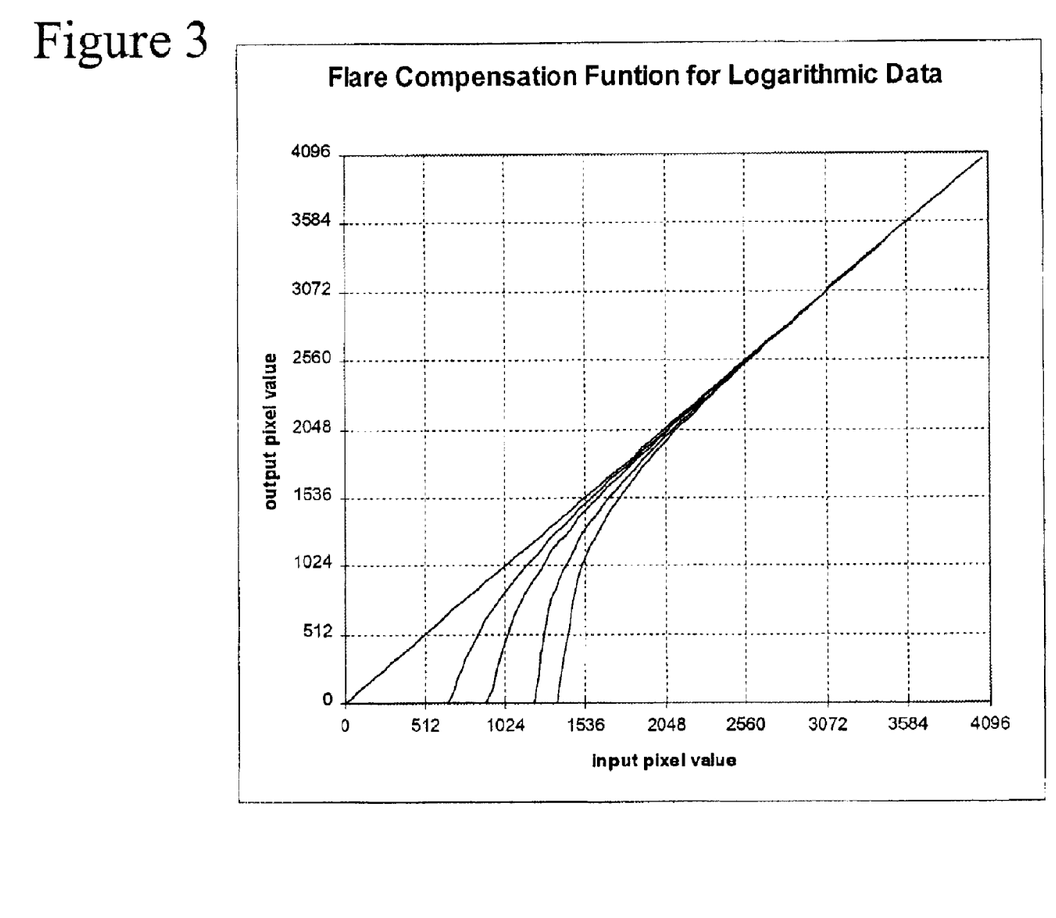
FIG. 3 is graph of a family of flare compensation functions generated with the present invention for logarithmic data.
Figure 4:
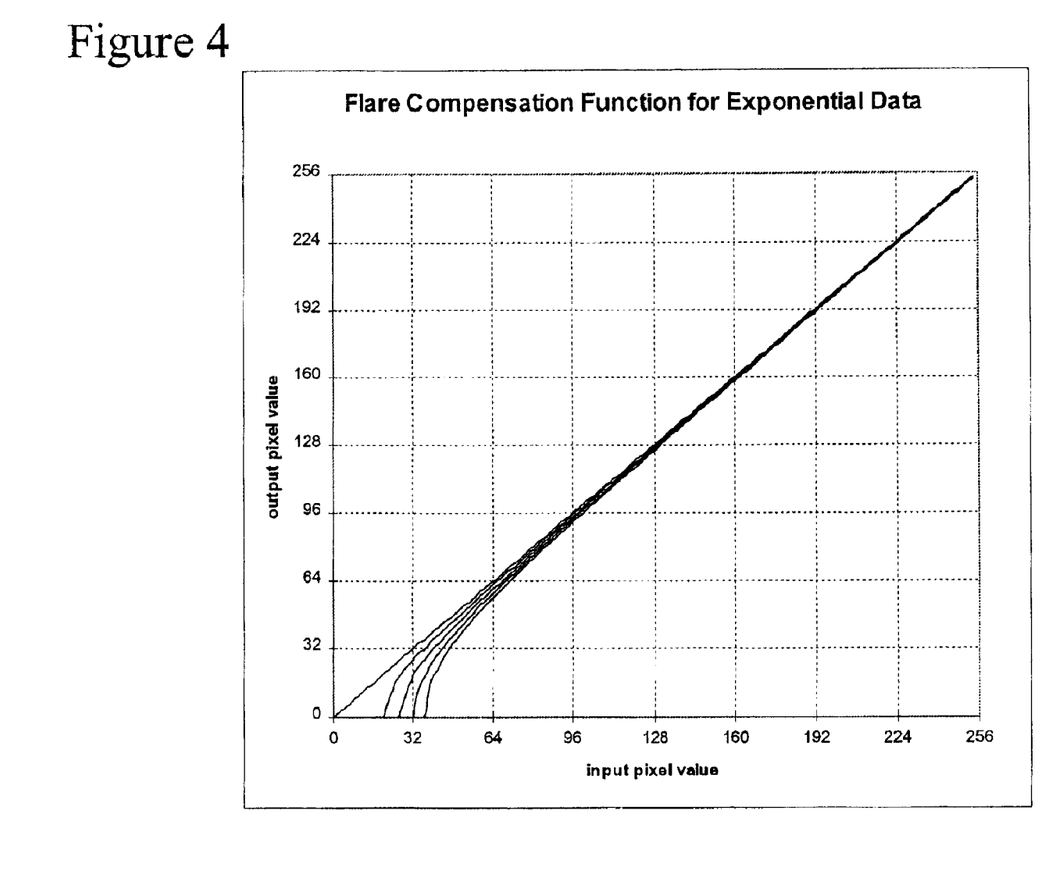
FIG. 4 is a graph of a family of flare compensation functions generated with the present invention for exponential data.

The present invention combines the flare function LUT with the linearization LUT ($F_1$) and the inverse linearization LUT ($F_2$) to form a flare compensation function, implemented in the form of a LUT, that can be applied directly to the pixel value of the source digital image 101 to produce the enhanced digital image 103. The mathematical equation for the construction of the flare compensation LUT $\xi(x)$ is given by (12):

$$\xi(x)=F_2(\Psi(F_1(x))) \tag{12}$$

where x represents the value of a source digital image pixel and $\xi(x)$ represent the value of the corresponding enhanced digital image pixel that has had the effects of flare light removed. FIG. 3 depicts a family of flare compensation LUT's generated with the present invention using different values for the flare light variable φ illustrating the non-linear shape of the flare compensation function that is applied directly to logarithmic image data. Similarly, FIG. 4 depicts a family of flare compensation LUT's generated with the present invention using different values for the φ variable illustrating the flare compensation function that is applied directly to exponential image data.

Alternatively, the linearization LUT can be applied to the source digital image 101 to produce a linearized digital image. The flare function LUT can be applied to the linearized digital image to produce a linearized flare compensated digital image. The inverse linearization LUT can then be applied to the linearized flare compensated digital image to produce the enhanced digital image.

Many digital cameras apply a rendering tone scale function to the image pixel data prior to applying the power law exponential function. The application of a rendering tone scale function produces processed images that have more graceful highlight clipping characteristics and an overall desired contrast. As such, the application of the rendering tone scale function alters the relationship of the source digital image pixel values with respect to the intensity of light in the original scene.

The present invention uses the method disclosed by Buhr et al. in U.S. Pat. No. 5,300,381, which is incorporated herein by reference, for generating a rendering tone scale function T(x) to approximate the rendering tone scale function applied by the original digital camera. The inverse rendering tone scale function $T^{-1}(y)$ is calculated in the following manner. Given the function T( ) and domain defined by $X_{min}$ (a minimum domain value) and $X_{max}$ (a maximum domain value), the function $T^{-1}( )$ is calculated by an iterative process. First the domain of the function $T^{-1}( )$ is determined by evaluating T(x) for all values of x greater than or equal to $X_{min}$ and less than or equal to $X_{max}$. The minimum and maximum evaluation values of T( ) are found as $Y_{min}$ and $Y_{max}$ respectively. For all values y ranging from $Y_{min}$ to $Y_{max}$ the closest T(x) value to y that is less than or equal to y is found. The value of the function $T^{-1}(y)$ is given by the corresponding x value.

For this embodiment of the present invention, the linearization LUT ($F_1$) is constructed by cascading the function f(x) as described by (1) with the inverse rendering tone scale function $T^{-1}(x)$ as given by (13):

$$F_1=T^{-1}(f(x)) \tag{13}$$

The inverse linearization LUT ($F_2$) is constructed by cascading the function b(x) as described by (2) with the rendering tone scale function T(x) as given by (14):

$$F_2=b(T(x)) \tag{14}$$

The flare compensation function is constructed using equation (12). Written in expanded form the formula for the flare compensation function is given by (15):

$$\xi(x) = b(T((\Psi(T^{-1}(f(x)))) \quad (15)$$

The mathematical formula given by equation (11) for removing the effects of flare light is the same as needed for removing the effects of atmospheric haze. Although designed for removing the affects of flare light, the present invention works well for digital images degraded by the atmospheric haze. Images photographed under diffuse lighting conditions suffer from a similar degradation effect as flare light and atmospheric haze. The present invention also works well for images degraded by the diffuse lighting conditions.

When the present invention is used to remove the effects of flare light as described by (11), the overall brightness of the digital image is affected. If the present invention is used in conjunction with a brightness balance algorithm, i.e. an algorithm that adjusts the brightness of a digital image, the order of operation may important. If the present invention is applied to the digital image first, the subsequent application of the brightness balance algorithm will adjust the brightness of the digital image. For this scenario, the overall brightness impact of the present invention is overridden by the subsequent application of the brightness balance algorithm. However, for applications which require the effects of flare removal without affecting the overall brightness of the digital image the present invention employs a modification to (11) for the calculation of the flare compensation function as given by (16):

$$\Psi(x) = (x - \phi)\phi_o/(\phi_o - \phi) \quad (16)$$

where $\phi_o$ represents the pixel value corresponding to the a mid-tone gray value, e.g. the pixel value corresponding to an 18 percent scene reflector. Although the expression given by (11) changes the value of all pixels, the processed digital images when viewed on an output imaging device are most affected in the dark regions of the image. However, if the value of $\phi$ is large, the overall brightness of the processed digital image will tend to be reduced. The expression given by (16) maintains the numerical pixel values equal to $\phi_o$. Thus it can be seen that $\Psi(\phi_o)$ is equal to $\phi_o$. Therefore, when expression (16) is used mid-tone pixel values are relatively unchanged thus maintaining the overall digital image brightness characteristics. Thus the present invention can be used in conjunction with brightness balance algorithms, or to process previously balanced digital images to remove the effects of flare light and also maintain the digital image brightness characteristic.

Figure 5:
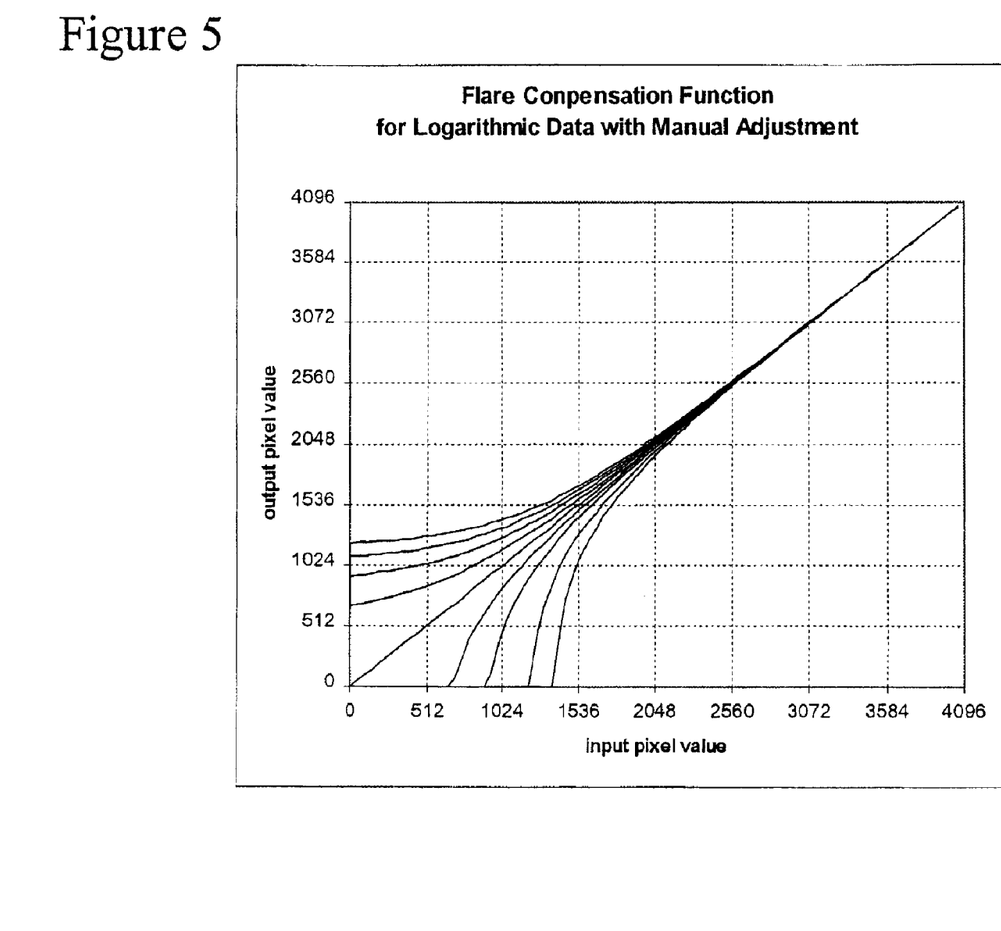
FIG. 5 is a graph of a family of flare compensation functions generated with the present invention for logarithmic data with manual adjustment.

In an alternative embodiment of the present invention, the enhanced digital image 103 is displayed on the image output device 30 using an electronic display device. A user of the digital image system views the displayed image in the context of a graphical user interface computer software program. The user is given an flare adjustment control as an element of the graphical user interface activated via the input control device 60. The flare adjustment control of the graphical user interface computer software program makes modifications to the flare light value in accordance with the user's adjustment selections. The modified flare light value is used, as in the same manner as described above, to generate a second enhanced digital image 103. The second enhanced digital image 103 is then displayed on the image output device 30 so that the user can evaluate the effect of the adjustment. FIG. 5 shows a family of flare compensation functions generated using the manual user adjustments. It is possible for the user to both remove and add flare in process of generating the enhanced digital image 103. The low slope curves shown in FIG. 5 correspond to adding flare light the source digital image. While the present invention is primarily designed to remove the effects of flare light, for some users and some types of imagery adding flare to an image can result in a more pleasing image.

The preferred embodiment of the present invention is described above as a software program. Those skilled in the art will readily recognize that the equivalent of such software may also be constructed in hardware. Because image processing algorithms and systems are well known, the present description is directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements thereof known in the art. Given the description as set forth in the following specification, all software implementation thereof as a computer program is conventional and within the ordinary skill in such arts.

The invention has been described with reference to a preferred embodiment. However, it will be appreciated that variations and modifications can be effected by a person of ordinary skill in the art without departing from the scope of the invention.

PARTS LIST 10 image capture device
20 digital image processor
30 image output device
40 general control processor
50 monitor device
60 input control device
70 offline memory device
101 source digital image
102 linear state digital image
103 enhanced digital image
104 meta-data
110 linearization module
120 flare level calculator
130 flare transform generator
140 flare transform applicator

What is claimed is:

1. A method of compensating a digital image for the effects of flare light in order to generate an enhanced digital image, said method comprising the steps of:
   a) receiving a source digital image derived from an original scene affected by imaged flare light wherein the source digital image includes a plurality of pixels with a known relationship to the intensity of light corresponding to the original scene;
   b) generating from the source digital image a first flare control parameter relating to the intensity of imaged flare light and a second flare control parameter relating to the average intensity level of imaged light in the original scene;
   c) calculating a flare compensation function using the first and second flare control parameters; and
   d) generating an enhanced digital image from the flare compensation function and the source digital image.

2. The method of claim 1 further comprising the step of generating a linear state digital image from the source digital image wherein the pixels of the linear state digital image have a linear relationship with the intensity of light corresponding to the original scene.

3. The method of claim 2 wherein the flare parameters are generated from the linear state digital image.

4. The method of claim 3 wherein the linear state digital image is of lower spatial resolution than the source digital image.

5. The method of claim 1 wherein the first control parameter is calculated from a minimum pixel value.

6. The method of claim 5 wherein the source digital image is a color image comprised of red, green and blue pixel values and the minimum pixel value is a minimum luminance value derived from a weighted average of the red, green and blue pixel values.

7. The method of claim 5 wherein the source digital image is a color image comprised of red, green and blue pixel values and the minimum pixel value is a minimum value of the red, green and blue pixel values.

8. The method of claim 1 wherein the second control parameter is calculated from a mean pixel value.

9. The method of claim 1 wherein the flare compensation function is implemented as a look-up-table.

10. The method of claim 1 wherein the source digital image has pixels relating to different colors and the flare compensation function is applied to the pixels of each color of the source digital image to generate the enhanced digital image.

11. The method of claim 1 wherein the known relationship of the source digital image pixels to the intensity of light corresponding to the original scene includes a linear function.

12. The method of claim 1 wherein the known relationship of the source digital image pixels to the intensity of light corresponding to the original scene includes a logarithmic function.

13. The method of claim 1 wherein the known relationship of the source digital image pixels to the intensity of light corresponding to the original scene includes an exponential function.

14. The method of claim 1 wherein the source digital image is derived from scanning a photographic film transparency.

15. The method of claim 1 wherein the source digital image is derived from scanning a photographic reflection print.

16. The method of claim 1 wherein the source digital image is derived from a digital camera.

17. A computer program product stored on a computer readable medium for performing the method of claim 1.

18. A method of compensating a digital image for the effects of flare light in order to generate an enhanced digital image, said method comprising the steps of:
   a) receiving a source digital image derived from an original scene affected by flare light wherein the source digital image includes a plurality of pixels with a known relationship to the intensity of light corresponding to the original scene;
   b) generating a linear state digital image from the source digital image wherein the pixels of the linear state digital image have a linear relationship with the intensity of light corresponding to the original scene;
   c) using the linear state digital image to calculate a first flare control parameter relating to the intensity of imaged flare light;
   d) using the linear state digital image to calculate a second flare control parameter relating to the average intensity level of imaged light in the original scene;
   e) calculating a flare compensation function using the first and second flare control parameters; and
   f) using the flare compensation function and the source digital image to generate an enhanced digital image.

19. The method of claim 18 wherein the linear state digital image is of lower spatial resolution than the source digital image.

20. The method of claim 18 wherein the first control parameter is calculated from a minimum pixel value.

21. The method of claim 20 wherein the source digital image is a color image comprised of red, green and blue pixel values and the minimum pixel value is a minimum luminance value derived from a weighted average of the red, green and blue pixel values.

22. The method of claim 20 wherein the source digital image is a color image comprised of red, green and blue pixel values and the minimum pixel value is a minimum value of the red, green and blue pixel values.

23. The method of claim 18 wherein the second control parameter is calculated from a mean pixel value.

24. The method of claim 18 further including the steps of:
   calculating a third flare control parameter as the ratio of the first flare control parameter to the second flare control parameter; and
   using the third flare control parameter to calculate the flare compensation function.

25. The method of claim 24 further including the steps of:
   generating a modified first flare control parameter when the value of the first flare control parameter exceeds a predetermined threshold; and
   using the modified first flare control parameter to calculate the flare compensation function.

26. The method of claim 18 wherein the flare compensation function is implemented as a look-up-table.

27. The method of claim 18 wherein the source digital image has pixels relating to different colors and the flare compensation function is applied to the pixels of each color of the source digital image to generate the enhanced digital image.

28. The method of claim 18 wherein the known relationship of the source digital image pixels to the intensity of light corresponding to the original scene includes a logarithmic function.

29. The method of claim 18 wherein the known relationship of the source digital image pixels to the intensity of light corresponding to the original scene includes an exponential function.

30. The method of claim 18 further including the steps of:
   a) receiving flare meta-data with the source digital image wherein the flare meta-data indicates an expected flare light performance capability of an optical system from which the source digital image is derived; and
   b) using the flare meta-data to generate the flare compensation function.

31. The method of claim 30 wherein the meta-data is used to vary the degree to which the flare is removed from the source digital image.

32. The method of claim 30 wherein the meta-data is a numerical value based on a measured indication of the flare characteristic of the optical system.

33. The method of claim 18 further including the steps of:
   a) displaying the enhanced digital image on an electronic display device;
   b) having a user manually adjust the first flare control parameter to produce a manually adjusted first control parameter value; and
   c) using the manually adjusted first control parameter value to generate an enhanced digital image.

34. A computer program product stored on a computer readable medium for performing the method of claim 1.

35. A method of compensating a digital image for the effects of flare light in order to generate an enhanced digital image, said method comprising the steps of:
   a) receiving a source digital image derived from an original scene affected by flare light wherein the source digital image includes a plurality of pixels;
   b) receiving flare meta-data with the source digital image wherein the flare meta-data indicates an expected flare light performance capability of an optical system from which the source digital image is derived; and
   c) using the flare meta-data to generate a flare compensation function; and
   d) using the flare compensation function and the source digital image to generate an enhanced digital image.

36. A computer program product stored on a computer readable medium for performing the method of claim 35.

37. A method of compensating a digital image for the effects of flare light in order to generate an enhanced digital image, said method comprising the steps of:
   a) receiving a source digital image derived from an original scene affected by imaged flare light wherein the source digital image includes a plurality of pixels with a known relationship to the intensity of light corresponding to the original scene;
   b) generating from the source digital image a first flare control parameter relating to the intensity of imaged flare light and a second flare control parameter relating to the average intensity level of imaged light in the original scene;
   c) calculating a flare compensation function using the first and second flare control parameters;
   d) modifying the flare compensation function for midtones of the source digital image; and
   e) generating an enhanced digital image from the modified flare compensation function and the source digital image, whereby flare is removed without substantially affecting the overall brightness of the source digital image.

38. A computer program product stored on a computer readable medium for performing the method of claim 37.

* * * * *